Feb. 20, 1951 M. J. DIKEMAN Re. 23,342

UNIVERSAL FLUID DRIVE AND CONTROL UNIT

Original Filed Jan. 5, 1949 7 Sheets-Sheet 1

INVENTOR.

Myron J. Dikeman

UNIVERSAL FLUID DRIVE AND CONTROL UNIT

Original Filed Jan. 5, 1949 7 Sheets-Sheet 2

INVENTOR.

Myron J. Dikeman

UNIVERSAL FLUID DRIVE AND CONTROL UNIT

Original Filed Jan. 5, 1949 7 Sheets-Sheet 3

INVENTOR.

Myron J. Dikeman

UNIVERSAL FLUID DRIVE AND CONTROL UNIT

Original Filed Jan. 5, 1949 7 Sheets-Sheet 4

INVENTOR.

Myron J. Dikeman

UNIVERSAL FLUID DRIVE AND CONTROL UNIT

Original Filed Jan. 5, 1949 7 Sheets-Sheet 5

INVENTOR.

Myron J. Dikeman

Feb. 20, 1951 M. J. DIKEMAN Re. 23,342
UNIVERSAL FLUID DRIVE AND CONTROL UNIT
Original Filed Jan. 5, 1949 7 Sheets-Sheet 6
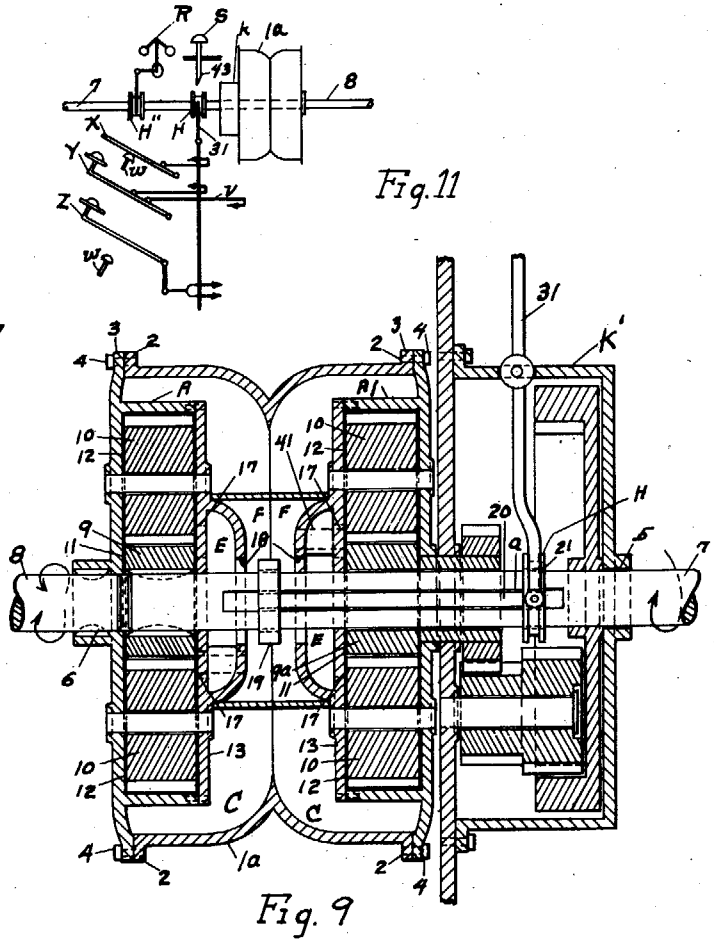
Fig. 11
Fig. 9
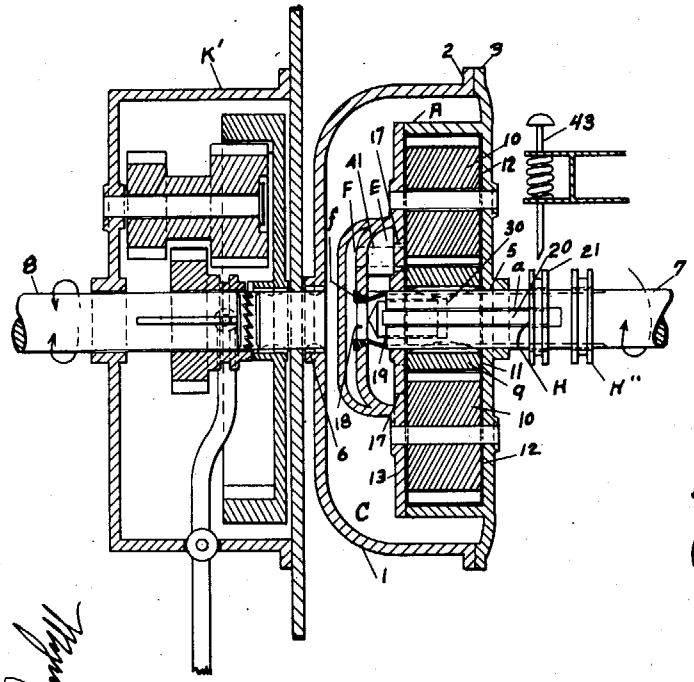
Fig. 8
INVENTOR.
Myron J. Dikeman UNIVERSAL FLUID DRIVE AND CONTROL UNIT
Original Filed Jan. 5, 1949 7 Sheets-Sheet 7
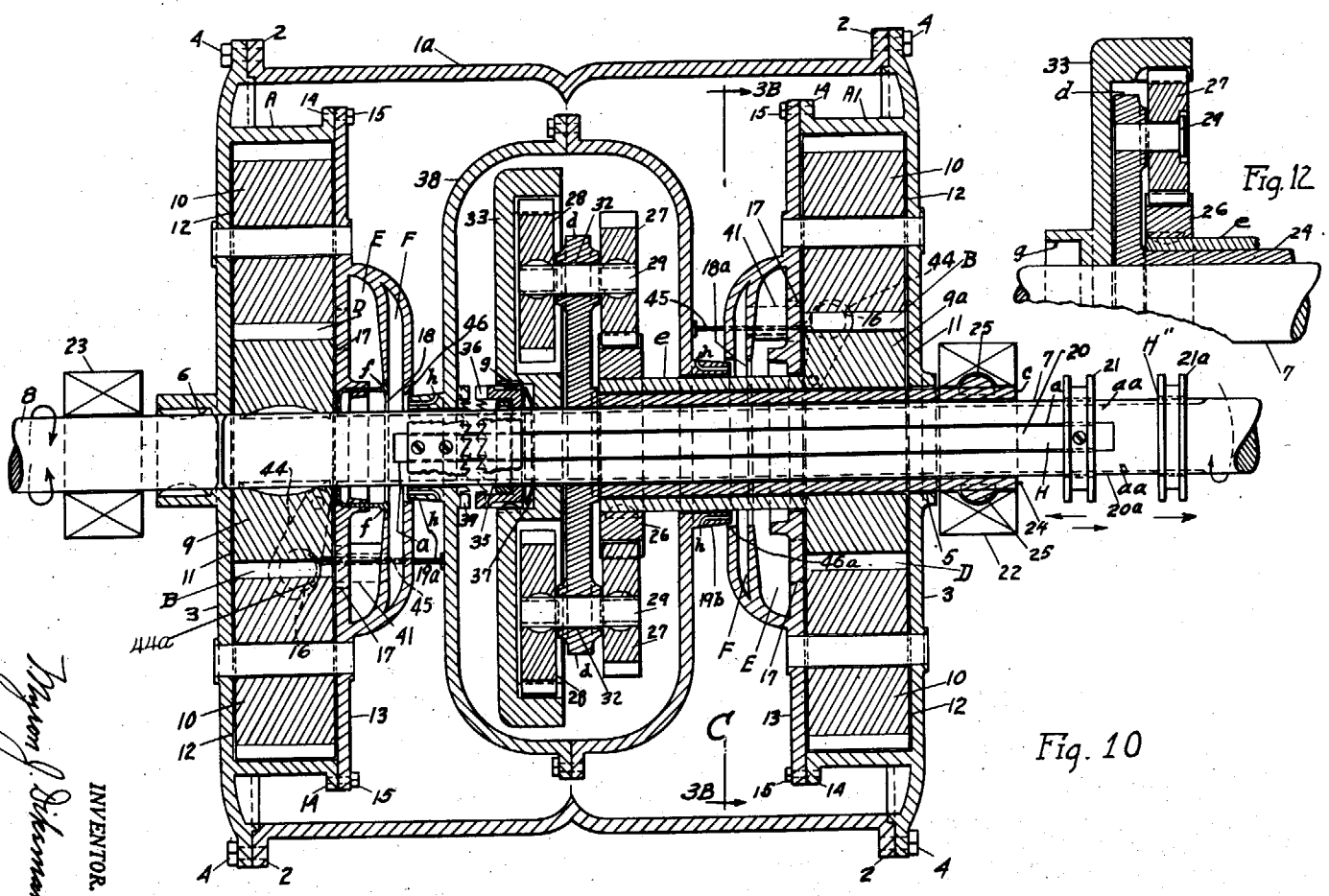
INVENTOR.
Myron J. Dikeman Reissued Feb. 20, 1951 Re. 23,342

UNITED STATES PATENT OFFICE 23,342

UNIVERSAL FLUID DRIVE AND CONTROL UNIT

Myron J. Dikeman, Grosse Pointe Woods, Mich.

Original No. 2,496,042, dated January 31, 1950, Serial No. 69,350, January 5, 1949. Application for reissue February 10, 1950, Serial No. 143,810

8 Claims. (Cl. 74—718)

Matter enclosed in heavy brackets [ ] appears in the original patent but forms no part of this reissue specification; matter printed in italics indicates the additions made by reissue

[This invention is a continuation in part of my former patent application Serial Number 20,513, filed April 12, 1948.]

The object of my invention is to provide a universal drive and control unit, especially adaptable to automobiles, and similar uses, that will automatically operate for full control of the vehicle, including the wheel brake.

Another object is to produce a universal power drive and control unit that will fully replace the automobile clutch and transmission units, and with full universal control in the automobile operations.

A further object is to provide a universal fluid drive and control unit that will provide for the respective gear sections to remain at rest, except when automatically connected for operations by the fluid valve control.

A still further object is to provide a universal drive and control unit fully operative and controlled by the ordinary foot pedals, or similar units, for any variable speed control in either direction, and subject to direct engine governor control.

Another object is to produce a universal fluid drive and control unit that is simple in construction, easily and efficiently operated and that can be manufactured at a very low cost.

These several objects are attained in the preferred form by the construction and arrangement of parts as are more fully hereinafter set forth.

Similar parts on all drawings are marked by similar numerals or letters.

The Figs. 1 and 1A are side elevations, of both single and double fluid drive and control units, respectively showing the exterior casing designs, and the interior fluid circulation compartment arrangements for the fluid control, adapted to either drive or brake units.

Fig. 8 is the same longitudinal sectional view as the Fig. 4, illustrating the single power drive unit as applied to [standard] reverse mechanism, for reversing the direction of rotation of the driven shaft, mechanically.

Fig. 9 is a similar sectional view as of the line 4—4 of the Fig. 2 of a similar dual drive and control unit, as connected to a similar [standard] reverse mechanism unit, for reversing the direction of rotation of the driven shaft, automatically.

Fig. 10 is likewise a similar longitudinal sectional view as of the same line 4—4 of the Fig. 2 of the dual drive and control unit, as shown in the Fig. 1A, showing my new dual universal fluid drive and control unit assembly, and the general arrangement and relative position of the various operating parts.

Fig. 11 is an assembly diagram illustrating a special hook-up of my universal drive and control unit and operating mechanism as installed for use on an ordinary automobile.

Fig. 12 shows a substitute single reverse gearing for Fig. 10.

Figure 2:
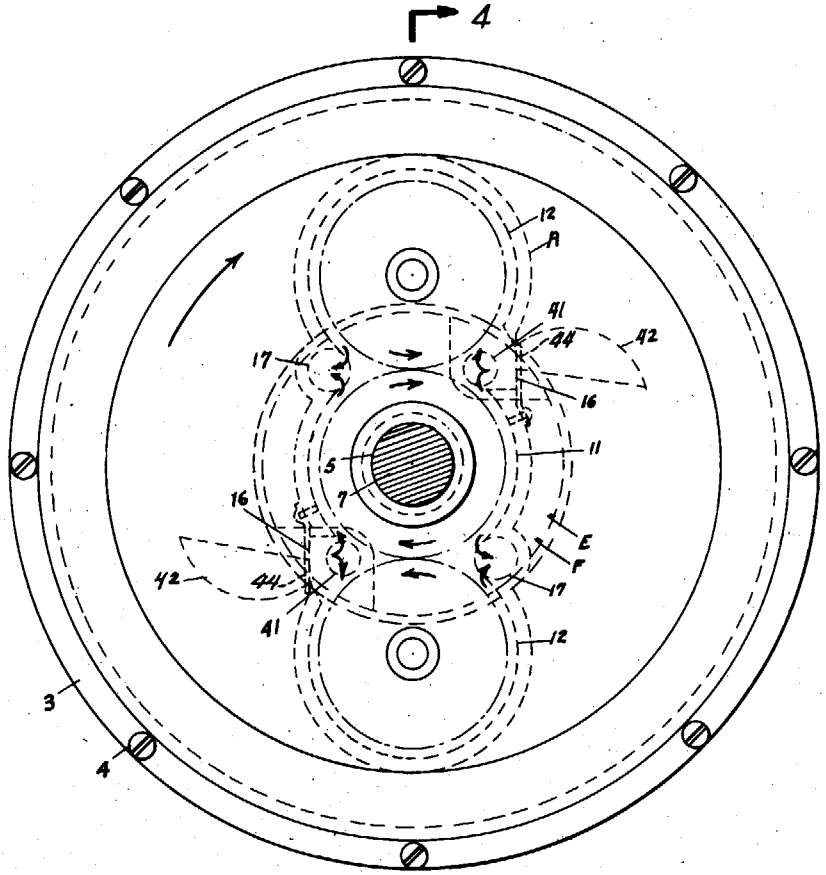
Fig. 2 is an end view of both the Figs. 1 and 1A, showing the respective positions of the fluid compartment ports, for both the single and the dual assemblies.

I will now describe more fully the detailed construction of my device, referring to the drawings and the marks thereon.

In general, the universal fluid power drive and control unit comprises a dual arrangement of the gear internal fluid flow control units as mounted on a common drive shaft, oppositely positioned thereon, one control unit drive gear being fixedly attached to said drive shaft, rotatable therewith, and with the opposite reverse control unit drive gear rotatably mounted over said shaft section or bearing, but rotatable in the opposite direction by suitable connected intervening reverse mechanism, said dual control power units being operative only one at a time, by displacement of a common valve control frame adjustably mounted therebetween, and operated by connected controls, or automatic governor units functioned by the power unit. The assembly is inclosed within a liquid tight casing and filled with suitable operating fluid. The universal unit completely replacing the standard automobile clutch and transmission now in common use.

It is pointed out that the prior fluid control devices, comprise, generally, a special fluid control unit, high pressure pump, immersed within a fluid filled drive casing, designed for mounting between adjoining rotatable shaft ends, and are of the external fluid flow type, the fluid being drawn from and discharged back into the outer casing chamber, said fluid always being subject to high speed, and centrifugal force resulting therefrom, thus forcing the fluid, in partially filled casings, away from the control unit central fluid intake port, leaving a vacant central section, also the high speed of the unit prevents any liquid from entering the intake port even when the casing is filled, thus rendering the various units inoperative under certain conditions; further, the control unit high pressure pump causes a full speed fluid flow through the casing chamber, "churning" the fluid, during all engine idling.

My new fluid drive and control unit is of the internal channel fluid flow, the fluid never returning to the outer casing during operations, but always remains and recirculates within the channeled unit passages, when once filled, and is wholly unaffected by the high speed, or the centrifugal *force* within the fluid resulting therefrom, and provides continuous operation of the unit under all conditions. Also the valved inlet and outlet fluid ports, prevents any fluid from entering the control unit pump, during engine idling, therefore, no pumping, or "churning" of the fluid ever occurs, as all fluid is substantially shut off from the unit intake ports when said port valves are closed.

My invention can best be understood by first describing the single fluid drive and control unit as illustrated in the Figs. 1 to 7 of the drawings, and of which units my dual universal drive and control unit is constructed.

The single control unit 1, as shown in Figs. 1, 2, 3 and 4, is made of any suitable metal either cast, turned, or pressed, as may be required, preferably cylindrical in design, closed at one end and formed with a circular edge flange 2 at the open end thereof. A turned casing head 3 is fixedly mounted over the end flange 2 and securely attached thereto by suitable threaded bolts 4, or any other suitable means. Shaft bearing openings 5 and 6 are formed through opposite casing ends, positioned concentric with the casing axis of rotation. Within the bearing 5 is rotatably mounted a drive shaft 7 having its inner end projected within the casing chamber C. Within the opposite casing end bearing 6 is fixedly mounted a driven shaft section 8, projected outside the casing walls, concentric with the casing axis and the drive shaft 7 mounted therein. Both the shaft sections 7 and 8 being properly supported by suitable external bearings not shown herein. Within the casing 1, fixedly attached to the head 3 and integral therewith, is a gear high pressure fluid drive and control unit A, herein illustrated in the preferred form as of a triple spur gear assembly, although other types of gear assemblies are applicable, as the number of idler gears, more or less, are not material to its operation. The unit gears 9 and 10 are of the flat gear design, preferably of equal diameters, and are rotatably mounted within true, surface fitting, pressure tight, adjoining cylindrical gear chamber sections 11 and 12. The gear chamber sections being positioned diametrically across the casing head and projected therefrom parallel with the casing axis, and symmetrically therewith. The drive gear 9 is fixedly mounted on the inner end of the drive shaft 7, rotatable therewith within the central gear chamber 11. The outer idler gears 10 are rotatably mounted on opposite sides thereof within their respective chambers 12, positioned to mesh with the common drive gear 9 and rotate therewith, forming a balanced assembly. The walls of the chambers 11 and 12 are designed to fit and engage the respective gear teeth ends and sides substantially liquid pressure tight, yet allow the inclosed gears to rotate freely therein. A head plate 13 is mounted over the gear chamber end and fixedly attached to the end wall flange 14 by suitable cap screws 15, said head plate being designed surface fitting with the respective gear ends, forming pressure tight fluid gear compartments throughout, also provided with concentric dual fluid outlet discharge and return chambers E and F projected from the outer head plate surface positioned concentric with the casing axis. On opposite sides of the assembled gear control unit A, opposite the respective external gear tooth rotation intersections B, are formed fluid intake openings 16 leading from the outer chamber C directly into the rotating gear teeth openings, which may be formed angular or straight as in the Figs. 3 or 2. On the alternate opposite sides of said control unit A, opposite the respective internal gear teeth rotation intersections D are formed fluid outlet openings 17, both leading directly into the common outlet chamber E which is provided with a central outlet port 18 positioned concentric with the casing axis, opening into the fluid return chamber F. Special fluid return channels 41 are formed through the head plate 13 leading from the return chamber F back to each of the respective intake channel ports 16, providing complete internal fluid recirculation within the control unit A, but which is replenished with operating fluid from the casing chamber C as required *during each starting*. The internal recirculation insures full liquid passage flow even at high velocities and the centrifugal force resulting therefrom. [In some cases] The port 16 [may be] *is* plugged, or valved, as required for flow regulation *and constant fluid pressure*, as indicated by pivoted control valve 44, preferably spring operated. The casing chamber C is filled with suitable fluid which flows through the respective intake ports 16 *when valve 44 is open* directly into the gear teeth recesses, rotating therewith around the outer gear circumferences and is then expelled through the fluid outlet ports 17 and into the head chamber E, by the converging gear teeth as they mesh together at the respective internal rotation intersections. The fluid within the chamber E, when the valve port 18 is open, is forced into the fluid outlet return chamber F and back through the fluid return channels 41 directly into the respective intake channel *of the valved* port 16 for recirculation through the control unit A, during operations, *power being transmitted through pressure fluid only, the closing of valve 44, after refilling, prevents any fluid escape, or fluid pressure release, therefore no energy loss during gear rotation as the fluid is by-passed around the gear teeth, continuing at full pressure throughout the entire recirculation. As "power" equals "torque" times "rotations," therefore, (with no energy loss), a decrease of rotations will result in an increase of the torque in the driven section, or "torque multiplication," as the fluid flow is regulated through the valve port 18.* The outlet port 18 is circular, and is positioned concentric with the drive shaft 7, adjacent the inner end thereof. Slidably mounted on the inner end of one of the said shaft sections, herein illustrated as being on the drive shaft 7, is a fluid control valve frame H, comprising a cylindrical valve plug 19, *solid or tubular*, also positioned concentric with the shaft axis and outlet port 18, and is slidably mounted within the shaft end cylindrical recess 30. The valve plug 19, *of any suitable design*, is operated by connected slide bars 20 fixedly attached thereto, positioned within suitable shaft slide grooves a and b extended along opposite shaft sides and projected outside the casing end bearing 5. The outer ends of the slide bars 20 are fixedly attached to a grooved circular clutch collar 21 mounted over the shaft body, slidable thereon in either direction, by any suitable clutch engaging means, herein illustrated as a pivoted clutch operating fork 31, in the Fig. 9 of the drawings. The assembled valve frame H may be controlled by connected foot pedals, or levers, illustrated in Fig. 11, for displacing the valve plug 19 to any desired positions for regulating the volume fluid flow, or for closing the port 18 altogether, as desired. The frame H and the valve plug 19 may also be mounted on the opposite drive shaft section 8, if desired, and may be operated from either casing end. The valve port 18 may be provided with an adjustable port collar f connected to an engine governor R by a similar slide operating frame H'', as illustrated in the Figs. 8, 10 and 11, operative for opening the valve port when the engine becomes overloaded, for releasing temporarily, the fluid flow through the port, and decreasing the unit load on the drive shaft 7. When a single control unit casing is fixedly mounted, as when applied as an automobile wheel brake unit, the outer fluid outlet chamber F may be omitted, if desired, and the casing chamber C may be reduced to any design or size, as in the Fig. 6, so long as the fluid passage channel 41 between the inlet and outlet ports be maintained, subject to valve control, and *chamber C* may be reduced to mere passage channels, or pipe lines therebetween, as illustrated in the [Figs. 5, 6 and 7] *Fig. 7* of the drawings.

Figure 1:
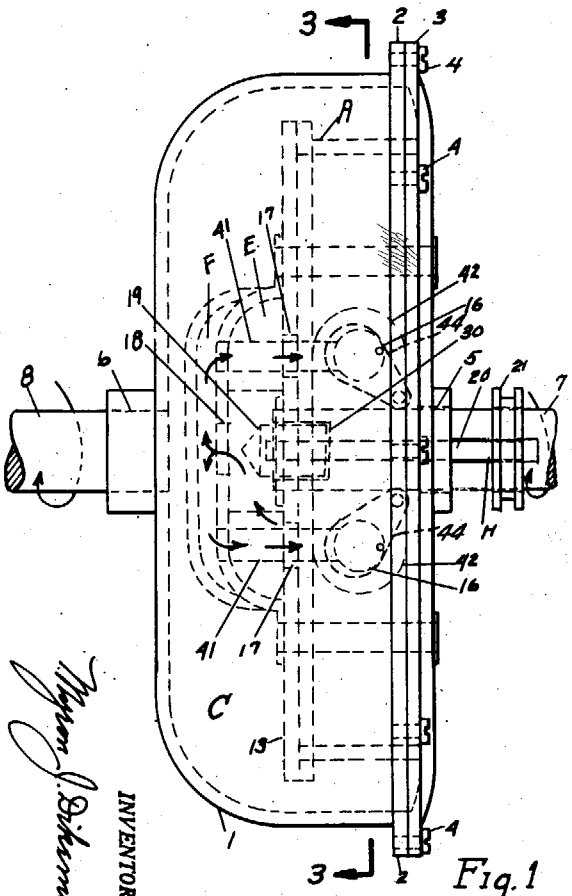
Figure 1A:
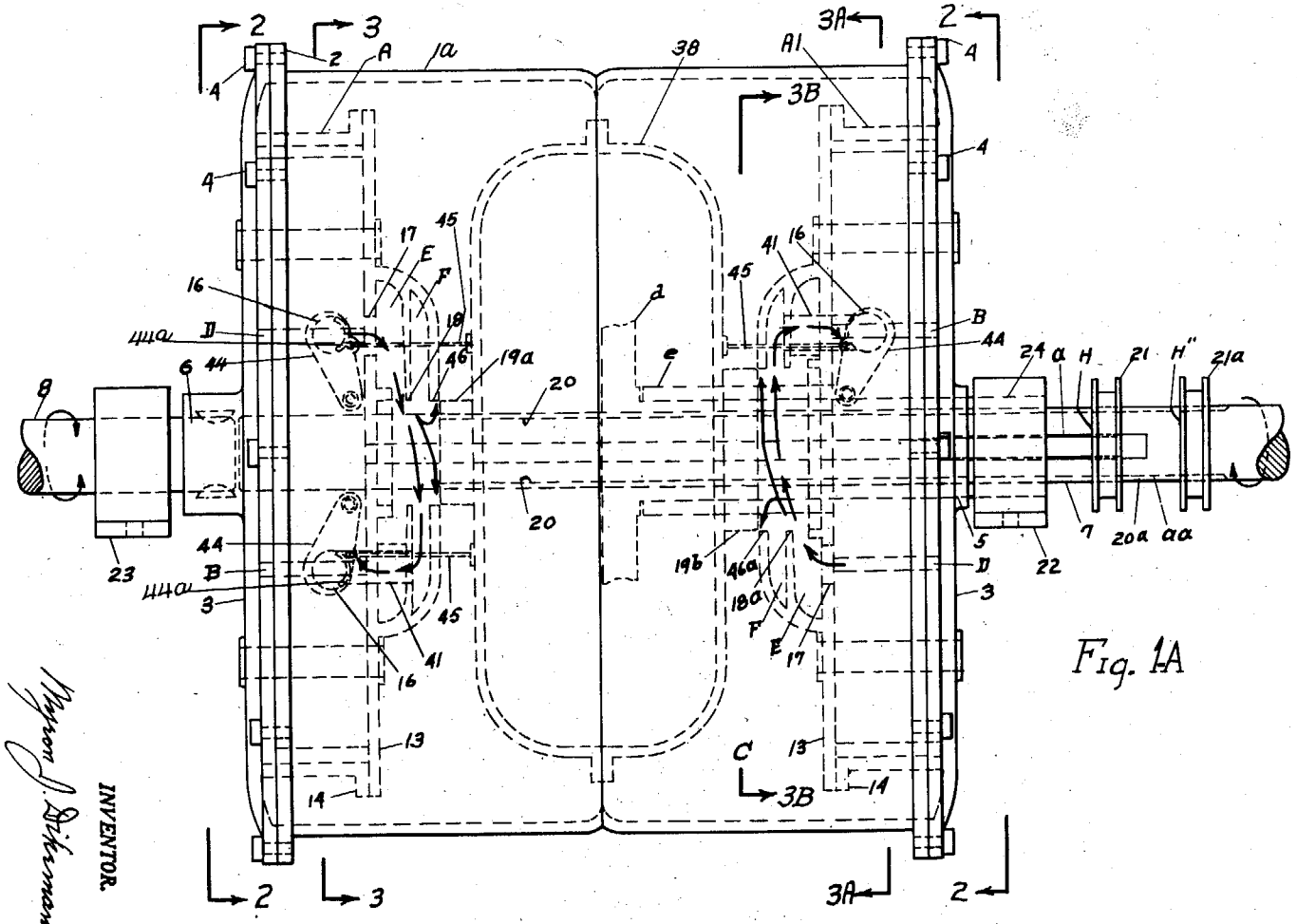
Figure 3:
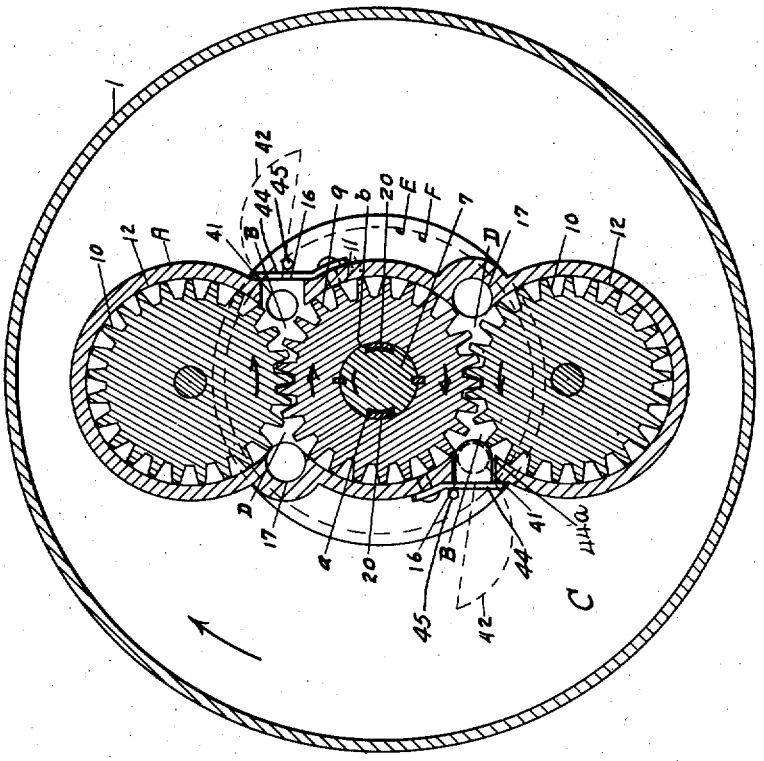
Fig. 3 is a cross-sectional view taken on the line 3—3 of the Fig. 1 and Fig. 1A, showing the sealed gear chamber design, and the various fluid control ports and control valves therein.
Figure 4:
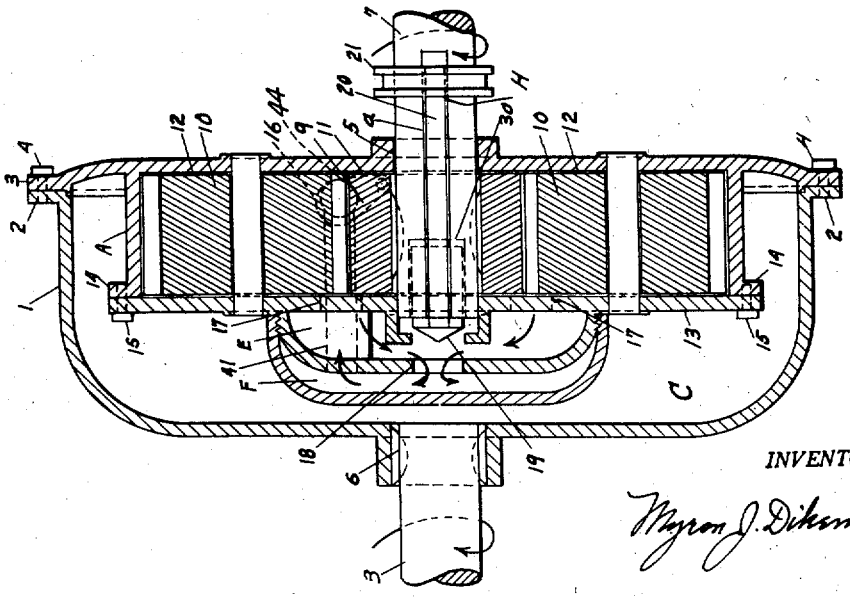
Fig. 4 is a longitudinal sectional view taken on the line 4—4 of the Fig. 2, showing the relative position of the gear ports and the valve operating mechanism for the single unit.
Figure 3B:
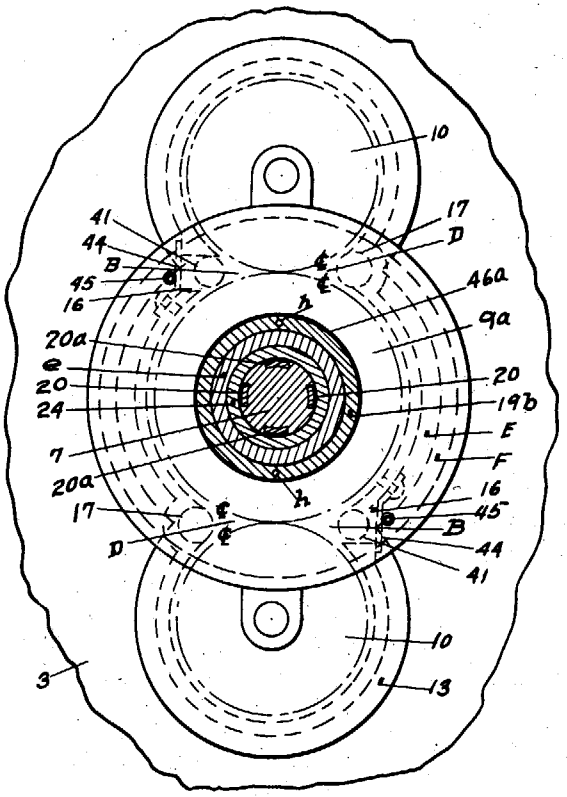
Fig. 3B is a cross-sectional view on the line 3B—3B of the Figs. 1A and 10, showing the special bearings and valved ports within the reverse fluid control unit A1.

My universal fluid power drive and control unit, as illustrated in the Figs. 1A, 3B, 10, and 13 of the drawings, comprise a dual arrangement of the fluid drive and control units A and A1 previously described, but slightly modified for assembly, each arranged at opposite ends of an extended cylindrical casing 1a mounted on the drive shaft 7 concentric therewith. The said drive unit A and the reverse unit A1 likewise comprise similar drive gears 9 and 9a respectively, and the idler gears 10 rotatably mounted on opposite sides thereof, all inclosed in like surface fitting, pressure tight gear chambers 11 and 12, as in the former case, and with suitable end bearing openings 5 and 6 in opposite casing ends. The cross-section of the control gears, as on the line 3A—3A of the Fig. 1A, is exactly the same as the previous Fig. 3, except that the central gear bearings are enlarged for receiving the extended bushing bearing 24 therethrough, as is shown in the Fig. 3B. The drive shaft 7 and the driven shaft 8 are rotatably mounted within bearings 22 and 23 respectively, fixedly attached to any suitable support frame. Within the bearing 22 is fixedly mounted an extended collar bushing 24 having its outer bushing end c fixedly clamped therein and retained by special keys 25 to prevent any rotation thereof. The bushing 24 is projected within the casing center and designed with a circular plate collar d concentric with the shaft axis, forming a rigid support frame within a rotatably mounted casing unit 1a, as shown in Fig.

Figure 13:
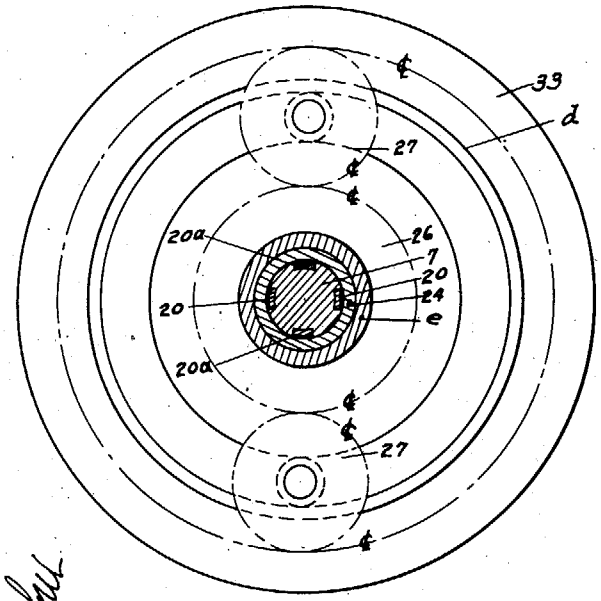
Fig. 13 is a cross-sectional view on the line 13—13 of the Fig. 10, showing the reverse gear assembly as mounted on the bushing bearing collar.
Figure 5:
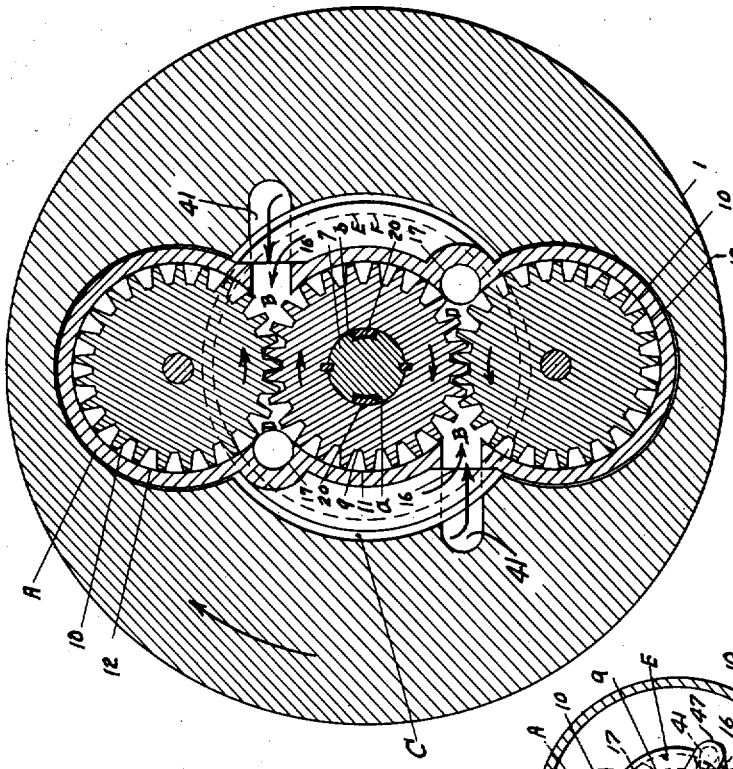
Figs. 5 and 6 are modified longitudinal *and* sectional views similar to the Figs. 3 and 4 respectively, illustrating thick casing walls designed to restrict the interior casing chamber to mere channel fluid return passages, without any change in the unit structural design.
Figure 6:
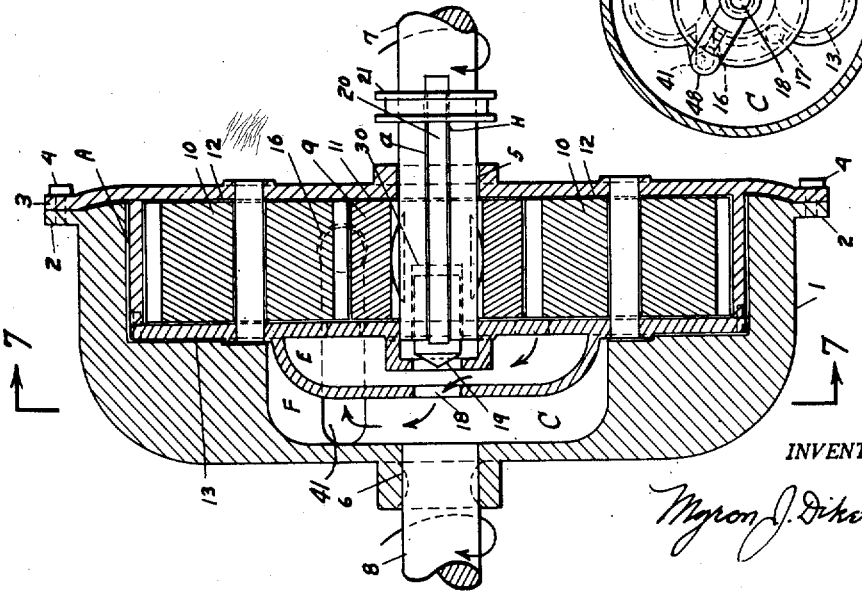

13. The drive shaft 7 is rotatably mounted through the extended collar bushing 24 and projected therein for nearly the full casing length. The driven shaft 8 is fixedly mounted in the opposite casing end bearing 6 as in the former case. The drive gear 9 of the unit A is fixedly attached to the drive shaft 7 and rotates therewith. The drive gear 9a of the reverse unit A1 is formed with an extended thimble collar bearing e having a power gear 26 fixedly mounted on the inner end thereof, rotatable on the collar bushing 24. The assembled reverse unit A1 being rotatably mounted over the drive gear thimble e and the collar bushing 24, free to rotate thereon. Rotatably mounted on the bushing collar d on opposite sides thereof, are dual idler gears 27 and 28 fixedly mounted on oposite ends of an idler stud shaft 29, as shown in Figs. 10 and 13. The stud shafts 29 are rotatably mounted within suitable bearings formed within the bushing collar d, and rotate therein. An internal drive gear 33 is rotatably mounted on the drive shaft 7 near the casing central position, designed and positioned to engage and mesh operatively with the dual reverse idler gears 28, for rotating the connected unit drive gear 9a of the reverse unit A1, when engaged, and is retained in position on the shaft 7 by a fixed shaft collar 35 keyed thereto. Single gears of Fig. 12 may be substituted for gears 27 and 28. A ring ratchet gear 36 is rotatably mounted over the shaft 7 within the internal gear recess g and slidably splined thereto by suitable key means, for rotating the internal gear 33 and connected mechanism, when engaged by the driving ratchet 39. The ring ratchet gear 36 being held in position also by the [fluid] *fixed* shaft collar 35, but adjustable within the recess against the spiral pressure collar spring unit 37 when driving pressure is applied thereto. An adjustable power control casing 38 formed with suitable tubular valve plug hubs 19a and 19b at opposite ends thereof, is rotatably mounted over the drive shaft 7 and the drive gear thimble bearing e respectively, and is splined to the shaft 7 by operating slide bars 20 slidably mounted within suitable opposite shaft grooves a and b and movable therein by the attached operating frame H as in the former case. The casing valve plug hubs 19a and 19b are preferably tubular, either internal or external type, *illustrative of any suitable valve*, designed and positioned to [enter] *operate* the casing chamber ports 46 and 46a, and the control unit fluid outlet ports 18 and 18a respectively, for regulating or closing the respective ports and the fluid flow therethrough as previously described; *a preferred valve design being illustrated in my copending application, Serial No. 147,975, filed March 6, 1950.* The said valve plug hubs being provided with suitable vent channels h to relieve the chamber liquid back pressure when said hub valves are fully closed within their respective outlet ports. When the frame 38 is adjusted to its central position, for engine idling, both the intake channel ports 16, or 16 and 41 together, are fully closed by the attached, *single or divided, wing* valves 44 *and 44a* [as] illustrated in the Fig. 3 *and Fig. 10*, by the connected operating rods 45, *preferably adjustable spring rods*, [also] *at the same time* the fluid outlet ports 18 and 18a are open, and [with] the casing chamber ports 46 and 46a stand practically closed, thus preventing further fluid flow into either fluid control unit A or A1, but allowing the fluid within the units to flow therefrom through the partially closed ports 46 and 46a, leaving the respective unit gears to rotate idly within their casing chambers, if still in motion, thus preventing any pumping, or "churning" of the casing fluid, during idling. The casing hub valves 19a and 19b, being tubular completely close the chamber ports 46 and 46a, and port 18 of chamber F, upon any casing 38 displacement in either direction, and again simultaneously reopen the respective inlet channel ports 16 and 41, for refilling the respective fluid control units A or A1, ready for operation. The valves 44 are only illustrative of any type of suitable valve mechanism for closing or regulating the fluid flow through the channel ports 16 and 41 when and as desired; *the valve may be designed as illustrated in my copending application Ser. No. 175,399, filed July 22, 1950. By utilizing a divided spring snap valve 44 and 44a, both channel ports 16 and 41 are opened, part way, together, by the rod 45, and the outer valve section 44 snaps closed again over the outer port 16 only, after fluid refilling, leaving the internal fluid recirculation to continue through channel 41 at high pressure and without loss of energy or power, as it is by-passed around gears during any rotation thereof, continuing at full pressure on the opposite gear teeth.* When both ports are closed the gear casings remain empty of fluid. The valves 44 are not necessary for the reverse fluid control unit as it does not rotate operatively except when the reverse gear 33 is connected. *The casing 38 may be retained centrally, when free, by any suitable spring means.* When the control casing 38 is moved toward the power drive unit A, the assembled universal unit casing 1a is locked directly with the drive shaft 7 and rotates the connected driven shaft 8 therewith for the forward driving movement, but when the control casing 38 is moved in the opposite direction by the attached operating frame H, it automatically closes the attached ratchet drive gear 39 with the adjustable ring ratchet gear 36, rotating therewith the connected internal drive gear 33 splined thereto, and the connected reverse gears 28, 27 and 26, or gear 27 directly as shown in the Fig. 12, thus reversing the connected drive gear 9a, and when said casing valve plug hub 19b is closed within the unit outlet port 18a, locking the inclosed unit gears 9a and 10, the assembled universal casing 1a will rotate in a reverse direction to the rotations of the drive shaft 7, and will automatically reverse the direction of rotation of the driven shaft 8, and reverse the direction of the automobile travel. The governor control R, illustrated in [Figs. 8, 10 and 11] *Fig. 11,* functions in the same manner as previously described, thus displacing the special control frame H'' through the clutch mechanism operatively connected to the groove collar 21a and slide bars 20a, as in the former case, and displacing the attached adjustable port collar f for opening and closing the same as previously described. The internal drive gear 33 may be keyed to the drive shaft 7, if desired, and rotate continuously therewith, and the ratchet gears may be omitted, as in the Fig. 9. To insure a more effective fluid intake, a curved scoop 42 may be attached to the respective intake openings 16 as illustrated in the Figs. 1 and 2 of the drawings, or when the control units A are subject to limited requirements, the outer port 16 may be closed, or regulated, by valve 44 as previously described, if desired, the respective control units A being operated by the fluid recirculation chambers when completely filled. The Figs. 5 and 6 are modified cross-sections of the same Figs. 3 and 4, but illustrated with thicker casing walls 1, the remaining mechanical structure being exactly the same as before, illustrating the reduction of size of the former chamber C as reduced to the size of the fluid return chamber F, thus duplicating same. The thick casing walls 1 being designed with special fluid return channels 41 formed therein, outside the unit A walls, instead of through the edge of the wall plate 13 as shown in the former Fig. 4. The channel 41 still leads from the same chamber F to the fluid intake channel port 16 as in the former case. The operation is exactly the same as in the previous Figs. 3 and 4.

Figure 7:
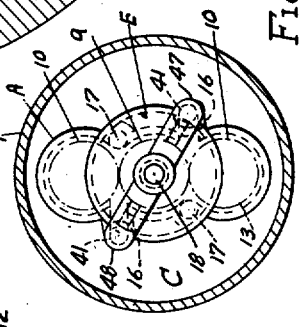
Fig. 7 is a further modified cross-sectional view similar to the Fig. 5, as of the line 7—7 of the Fig. 6, illustrating the same restricted channel fluid return passage, as represented by mere pipe lines connecting with the fluid central outlet port as provided therein.

The Fig. 7 is a slightly further modification in detail design only, indicated as taken on the line 7—7 of the Fig. 6, illustrating the same fluid return channel 41 as being inclosed in special pipe lines 47 and 48, likewise connecting the same chamber F with the same fluid intake channel port 16, exactly the same as both previous cases, otherwise using the same mechanical structure as shown and described. The Figs. 5, 6, and 7, merely illustrating different designs for the same fluid return channels 41.

My universal fluid drive and control unit may also be assembled in the dual combination, with the reverse gearing unit [K'] mounted on the outside of the casing, as illustrated *by K'* in the Fig. 9 of the drawings, and the respective unit gears operated in the same manner as described in the previous unit, *either with or without the ratchet clutch 39 which could be inserted between the drive shaft 7 and the ring drive gear of the reverse gearing unit.*

When the casing chamber C is filled with suitable fluid and the drive shaft 7 rotated, the fluid is drawn within the respective control units A, as the valve 44 is opened *temporarily* through the casing inlet channel ports 16, filling the chamber recesses B and D, and again discharged through the casing outlet ports 17 into the common chamber E. When the valve port 18 is open, or partially open, the fluid is forced therethrough into the return chamber F thence through the connected return channels 41 back into the intake port passage 16, for recirculation, *valve 44 being closed,* or when in central idling position, flows out port 46 back into chamber C. Any fluid deficiency, by leakage etc., being replaced by the port intake 16, when valve 44 is open, direct from the chamber C. When the operating valve 19a or 19b, is closed, or partially closed, the control unit A, or A1, is locked by the fluid back pressure, or restrained in rotation, as the case may be, and the assembled control unit *is* forced to rotate with the shaft 7, or in reverse ratio to the actual fluid flow, *thus producing torque multiplication on the driven shaft, similarly to the old gear transmission, and without loss of energy.* When installed on an automobile as a power driving unit, the operating frame H is preferably connected to the gas accelerator pedal X, illustrated in the Fig. 11, and the control casing hub valve plug 19a, is closed, or adjusted, within the respective operating ports 18 for driving the assembled unit in the forward rotation, or when adjusted by a connected adjacent foot pedal Z, the control casing hub valve plug 19b is moved in the reverse direction to engage and close the port 18a, in like manner, and thereby reverse the rotation direction for reversing the automobile movement.

When coasting down hill, before the gas accelerator pedal is released, a dash push button S, as illustrated in the Figs. 8 and 11, may be depressed, thus locking the operating valve plug 19 in its closed position by a connected groove collar pin 43, or similar units, thus utilizing the engine cylinder back pressure as an auxiliary brake unit, but which is automatically released as the gas accelerator pedal X is again depressed.

The engine governor R, as in the Fig. 11, if applied, indicates an engine overload, and may be connected to the auxiliary clutch operating frame H'' and attached valve port ring f, to variably enlarge the outlet port 18, for releasing temporarily, the unit fluid back-pressure and corresponding load ratio, until engine recovery. Its operation is automatic.

When the single fluid drive and control unit is applied as a shaft speed control, the valve 19 *and dual chambers E and F* may be omitted, if desired, and the respective port opening *or recirculating channels* designed for a predetermined fluid flow therethrough *for complete internal flow between intake and discharge gear sections*. When the single control unit is applied as an automobile wheel brake unit, the fixed shaft section 8 is then designed tubular in form and becomes the automobile axle housing, as applied, and retains the casing 1 in a fixed position. The rotatable shaft section 7 is extended through the hollow fixed shaft section 8 and becomes the axle drive shaft upon which the wheel is mounted. The clutch operating frame H is connected to the foot pedal Y, as illustrated in Fig. 11, and operates the unit in the same manner as previously described, but functions oppositely to retard, or stop the wheel, as the casing 1 is fixedly mounted. In the stationary units, such as wheel brakes, the actual position of the port 18 is not material, providing suitable operating mechanism may be applied thereto. When connecting the brake foot pedal Y, it is desirable also to connect same to the drive unit operating frame H, *but* without gas *connection*, and again utilize the engine back-pressure as an auxiliary brake unit together with the respective wheel brakes.

Having fully described my universal fluid drive and control unit, what I claim as my invention and desire to secure by Letters Patent is:

1. A universal fluid drive and control unit adapted for transmitting power from one rotatable unit to another as mounted in fixed support bearings, and used therewith, for controlling the direction of rotation and speed of the driven unit, comprising a closed cylindrical, fluid filled, power casing having a drive shaft and a driven shaft mounted at opposite ends thereof, concentric with the casing axis, the driven shaft being fixedly mounted to the casing end, and the drive shaft rotatably mounted therein and projected through the casing chamber, a drive fluid control unit and a reverse fluid control unit, each provided with driving mechanism, fixedly mounted in opposite casing ends concentric with the rotatably mounted drive shaft and operatively mounted thereon, said drive fluid control unit driving mechanism being operatively connected to said drive shaft, and rotatable thereby, and said reverse control unit driving mechanism being rotatably mounted over said drive shaft, reverse gear mechanism operatively mounted on said rotatably mounted drive shaft, positioned [centrally between said two fluid control units] and operatively connected to the reverse control unit driving mechanism designed for rotating same in a direction opposite to the said rotatably mounted drive shaft rotations, [ratchet casing] *drive* means with *drive and reverse unit control* port valve hubs, for connecting said reverse gear mechanism to the said rotatably mounted drive shaft and for operating the reverse fluid control unit, an adjustable operating frame slidably mounted over one of said shafts and projected within the power casing chamber and connected to said [ratchet casing] *drive* means for controlling and operating the respective drive fluid control unit and reverse fluid control unit at will, for transmitting rotating power from said drive shaft and controlling the direction and speed of the power casing and fixedly attached driven shaft, and means for operatively adjusting said operating frame in either direction for engaging and operating the respective drive and reverse fluid control units.

2. A universal fluid drive and control unit adapted for transmitting power from one rotatable unit to another for controlling the direction and speed of a driven rotatable unit, comprising a closed cylindrical, fluid filled, power casing having a drive shaft and a driven shaft mounted at opposite ends thereof concentric with the casing axis, the driven shaft being fixedly mounted to one casing end, and the drive shaft rotatably mounted therein and projected through the casing chamber, a gear drive fluid control unit and a gear reverse fluid control unit, each provided with a central drive gear, fixedly mounted in opposite casing ends concentric with the rotatably mounted drive shaft and operatively mounted thereon, said drive fluid control unit drive gear being fixedly attached to the rotatably mounted drive shaft, and rotatable thereby, and the said reverse fluid control unit drive gear being rotatably mounted over said drive shaft and extended within power casing chamber to receive a dual spur drive gear thereon, reverse gear mechanism mounted on said rotatably mounted drive shaft, positioned centrally between the respective drive and reverse fluid control units, and connected operatively to the reverse control unit dual drive gear, designed for rotating same in a direction opposite to the said drive shaft rotations, ratchet means mounted on said drive shaft for connecting said reverse gear mechanism therewith for operating same, an adjustable control casing with port valve hubs designed to inclose said reverse gearing, slidably mounted on said rotatable drive shaft, movable in both directions thereon, for engaging the control unit fluid ports and controlling the operations of the respective drive fluid control unit and the reverse fluid control unit, for transmitting rotating power and controlling the direction of rotation and speed of the power casing and connected driven shaft, adjustable valve frame operating mechanism mounted on one shaft for attaching to and displacing the said control casing in either direction for engaging and operating the respective drive and reverse fluid control units.

3. A universal fluid drive and control unit adapted for transmitting power from one rotatable unit to another for controlling the direction of rotation and speed of a connected driven unit, comprising a closed cylindrical, fluid filled, power casing formed with one end shaft bearing, and having a drive shaft and a driven shaft mounted at opposite ends thereof concentric with the casing axis, the driven shaft being fixedly mounted to one casing end, and the drive shaft rotatably mounted therein and projected through the casing chamber, a gear drive fluid control unit and a gear reverse fluid control unit, each formed with exterior fluid intake ports, and each comprising a central drive gear meshing with adjacent idler gear assembly rotatably mounted within a surface fitting gear casing, fixedly mounted on opposite power casing ends, each of said gear casings also being designed with adjacent, concentric dual fluid discharge chambers and with concentric intervening fluid valve outlet ports, and internal fluid passages formed therethrough for a full internal fluid recirculation, said chambers and outlet ports positioned concentric with the rotatable drive shaft and operatively mounted thereon, an elongated fixedly mounted bushing bearing mounted over said drive shaft and projected through the power casing end bearing and the reverse control unit drive gear, to a position near the power casing center, said drive fluid control unit drive gear being operatively attached to the rotatable drive shaft, and rotatable thereby, and the reverse fluid control drive gear being rotatably mounted over the said bushing bearing internal section, said reverse unit drive gear being extended outside its gear casing and provided with a dual spur drive gear thereon, positioned centrally within the casing chamber, reverse gear mechanism mounted over said bushing bearing inner end and the rotatable drive shaft, positioned centrally between the respective control units and connected operatively with the reverse control unit dual drive gear, designed for rotating the casing in a direction opposite the rotatable drive shaft rotations when connected thereto, an adjustable control casing with hub valve plugs, designed and positioned to engage the respective control unit casing fluid outlet ports, slidably mounted over said reverse gearing and supporting drive shaft, movable in both directions, for engaging, controlling and operating the respective fluid control units, ratchet cluch means mounted on the drive shaft for connecting the drive shaft to the adjacent reverse mechanism when said control casing is displaced toward the reverse control unit, and closing the respective valve hubs within the respective control unit discharge port, and valve frame operating mechanism mounted on said drive shaft connected to said control casing.

4. A universal fluid drive and control unit for transmitting power and controlling the direction and speed of a connected driven unit, comprising a closed, cylindrical, fluid filled power casing formed with one end shaft bearing, and having a drive shaft and a driven shaft mounted within opposite ends thereof concentric with the casing axis, the driven shaft being fixedly mounted to one casing end, and the drive shaft rotatably mounted in the opposite casing end and projected through the casing chamber, an extended collared bushing bearing mounted over the said drive shaft and through the casing shaft bearing, positioned with the bushing collar near the power casing center, a gear drive fluid control unit and a gear reverse fluid control unit fixedly mounted in opposite power casing ends, concentric with the drive shaft, and operatively mounted thereon, each of said fluid control units comprising a gear assembly positioned about a central drive gear, all rotatably mounted within a surface fitting gear casing designed with fluid intake ports through the casing edge wall, and with concentric, dual fluid discharge chambers formed on its side wall concentric with the drive shaft axis, provided with fluid outlet ports opening therethrough, said casing also being provided with recirculating fluid channels between the outer dual discharge chamber and the respective fluid intake port channels, said drive control unit drive gear being operatively attached to the shaft, and rotatable thereby, and the reverse control unit drive gear being rotatably mounted over said extended bushing bearing and formed with an extended dual spur drive gear on the inner end thereof, idler gears rotatably mounted on said bushing bearing, positioned to mesh with the reverse fluid control unit dual drive gear, an internal power gear rotatably mounted on said rotatable drive shaft, designed and positioned to engage and operate the said idler gears and rotate the connected reverse fluid control unit in direction opposite to the said rotatable drive shaft when operatively connected thereto, means for connecting said internal power gear to the rotatably mounted drive shaft, an adjustable valve control frame with hub valve plugs, each designed to engage the respective control unit dual chamber outlet port, slidably mounted over said reverse gearing and supporting shaft, movable in both directions for engaging and controlling the fluid flow of the respective fluid control units and outlet ports when engaged therewith, suitable valve frame operating mechanism mounted on said drive shaft for operating the respective control unit discharge valves, port valve mechanism for closing and regulating the connected fluid recirculation and intake channel ports, and operating mechanism connected to said port valves for closing same simultaneously as the outlet port valve plug is opened.

5. A geared fluid control unit mechanism for mounting on a drive shaft within a fluid filled power casing, for transmitting and controlling driving power from one rotatable shaft to another, and used in combination therewith, comprising a rotatably mounted spur gear assembly symmetrically positioned about a central common drive gear mountable operatively on a drive shaft, a surface fitting gear casing mounted over said gear assembly, forming gear fluid intake and fluid discharge sections on opposite sides of the respective meshed gear teeth intersections, said gear casing being formed with a fluid intake channel port through its wall edge at the respective gear fluid intake intersections, and with adjoining concentric dual discharge and return fluid chambers formed with an intervening wall, mounted on the casing inner side wall positioned concentric with the said central drive gear axis, said dual discharge and return chambers being designed with a central valve fluid outlet port through the intervening chamber wall also positioned concentric with the central drive gear axis, discharge ports formed in the casing inner side wall connecting the said dual discharge chamber with the respective gear fluid discharge intersections, fluid recirculating channels and ports formed between the outer dual return chamber and the respective fluid intake channel ports, valved means mounted over said fluid intake and recirculating ports, for closing and regulating same, and valve means for operating said valved chamber outlet ports for opening and closing same.

6. A fluid drive and control unit adapted for transmitting driving power from one rotatable shaft to another, and used in combination therewith, comprising a closed, cylindrical, fluid filled power casing having a drive shaft and a driven shaft mounted in opposite ends thereof concentric with the casing axis, the driven shaft being fixedly mounted to the casing end, and the drive shaft rotatably mounted therethrough and projected within the casing chamber, a gear assembly having a central drive gear, rotatably mounted inside the power casing end, positioned with the central drive gear operatively connected to the drive shaft, a surface fitting gear casing mounted over said gear assembly, forming gear fluid intake and fluid discharge sections on opposite sides of the respective meshed gear teeth intersections, and rigidly attached to the power casing head integral therewith, said gear casing being designed with adjacent concentric dual fluid discharge chambers projected from the casing side wall, and formed with an intervening wall therebetween, both chambers being positioned concentric with the drive shaft axis, said gear casing being also designed with a fluid intake channel port formed through the casing edge wall positioned opposite the gear fluid intake intersections, fluid outlet ports formed through the inner casing side wall positioned opposite the gear fluid discharge intersections and opening into the inner dual fluid discharge chamber, a fluid discharge port formed through the dual chamber intervening wall positioned concentric with the drive shaft axis, an adjustable port collar mounted within the said fluid discharge port, fluid circulating channels formed adjacent the gear assembly leading from the outside dual discharge chamber to the respective fluid intake channels, adjustable valve units mounted over the gear casing intake and recirculation channel ports, adjustable valve means mounted on the drive shaft, designed and positioned centrally to engage the dual fluid outlet chamber discharge port, means for operating said discharge port valve for closing and regulating the discharge port opening, means for simultaneously operating the respective fluid intake and recirculation port valves for regulating the flow therethrough, and means for automatically adjusting the position of the adjustable discharge port collar.

7. A fluid drive and speed control unit for transmitting power, and speed control, of a connected driven shaft, and used therewith, comprising a closed cylindrical, fluid filled power casing having a drive shaft and a driven shaft mounted on opposite ends thereof, the driven shaft being fixedly mounted to one casing end, and the drive shaft rotatably mounted therethrough, both shafts being positioned concentric with the casing axis, a gear assembly having a central drive gear, rotatably mounted within the power casing on the drive shaft end, positioned with the central drive gear operatively mounted on said drive shaft, and operative thereby, a surface fitted gear casing mounted over said gear assembly, forming gear fluid intake and fluid discharge sections on opposite sides of the respective meshed gear teeth intersections, and fixedly attached to the power casing end wall, said gear casing being formed with a fluid intake port through its edge wall opposite the gear intake intersections, and with fluid outlet ports formed through its side wall opposite its gear fluid discharge intersections, said gear casing also being designed with adjacent concentric dual fluid discharge chambers projected outside the gear chamber central side wall and formed with an intervening wall therebetween, said inner dual discharge chamber being positioned to inclose the said casing fluid outlet ports therein, a predetermined size discharge port formed through the dual chamber intervening wall, and a fluid recirculation channel formed outside the gear assembly connecting the outer fluid discharge chamber with the fluid intake port channels.

8. A fluid brake unit adapted for braking or stopping a vehicle wheel, and used in combination therewith, comprising a closed, cylindrical, fluid filled casing designed with shaft bearing openings at opposite ends thereof, concentric with the casing axis, a hollow shaft fixedly mounted to one of said bearing openings, a drive shaft member rotatably mounted through the opposite casing and bearing opening, said drive shaft being projected through the hollow shaft, a gear assembly having a central drive gear, rotatably mounted within the [power] casing end, positioned with the central drive gear operatively mounted over the drive shaft and fixedly attached thereto, a surface fitting gear casing mounted over the gear assembly, forming a gear fluid intake and fluid discharge sections on opposite sides of the respective meshed gear teeth intersections, and fixedly attached to the casing head, said gear casing being designed with adjacent concentric dual fluid discharge chambers projected oustide said gear casing side wall, and formed with an intervening wall therebetween, both dual chambers being concentric with the drive shaft axis, said gear casing also being designed with fluid intake channel ports positioned opposite the gear fluid intake intersections, fluid outlet ports formed through the casing inner side wall opposite the gear fluid discharge intersections, and opening into the inner dual discharge chamber, a fluid discharge port formed through said dual chamber intervening wall concentric with the drive shaft axis, fluid recirculating channels formed adjacent the gear assembly connecting the outside dual discharge chamber with the respective fluid intake port channels, a valve means mounted over the drive shaft end designed and positioned to engage said dual chamber discharge port, and means for operating said discharge port valve.

MYRON J. DIKEMAN.

REFERENCES CITED

The following references are of record in the file of this patent or the original patent:

UNITED STATES PATENTS

| Number | Name | Date |
|---|---|---|
| 1,126,102 | Severy et al. | Jan. 26, 1915 |
| 1,529,061 | Gordon | Mar. 10, 1925 |
| 1,882,222 | Lewis | Oct. 11, 1932 |
| 2,165,934 | Mealey | July 11, 1939 |
| 2,193,806 | Devore | Mar. 19, 1940 |
| 2,301,294 | Kuhns | Nov. 10, 1942 |
| 2,311,150 | Buracznski | Feb. 16, 1943 |
| 2,311,237 | Loveday | Mar. 9, 1943 |
| 2,313,049 | Cook | Mar. 9, 1943 |
| 2,354,597 | Jandasek | July 25, 1944 |
| 2,424,384 | Comstock | July 22, 1947 |

FOREIGN PATENTS

| Number | Country | Date |
|---|---|---|
| 33,848 | Denmark | Dec. 7, 1922 |
| 573,669 | Great Britain | Nov. 30, 1945 |
| 575,395 | France | July 29, 1924 |

OTHER REFERENCES

Publication: Machine Design, issue of December 1945, pages 109 and 110.